(12) United States Patent
Zheng

(10) Patent No.: US 12,453,715 B2
(45) Date of Patent: Oct. 28, 2025

(54) USE OF ARTEMETHER IN THE PREVENTION AND TREATMENT OF ALZHEIMER'S DISEASE

(71) Applicant: UNIVERSITY OF MACAU, Macao (CN)

(72) Inventor: Wenhua Zheng, Macao (CN)

(73) Assignee: UNIVERSITY OF MACAU, Macao (CN)

( * ) Notice: Subject to any disclaimer, the term of this patent is extended or adjusted under 35 U.S.C. 154(b) by 1012 days.

(21) Appl. No.: 17/206,420

(22) Filed: Mar. 19, 2021

(65) Prior Publication Data

US 2021/0205265 A1 Jul. 8, 2021

Related U.S. Application Data

(63) Continuation-in-part of application No. PCT/CN2018/113458, filed on Nov. 1, 2018.

(30) Foreign Application Priority Data

Oct. 8, 2018 (CN) .......................... 201811169454.6

(51) Int. Cl.
*A61K 31/357* (2006.01)
*A61P 25/28* (2006.01)

(52) U.S. Cl.
CPC ............ *A61K 31/357* (2013.01); *A61P 25/28* (2018.01)

(58) Field of Classification Search
CPC ............................... A61K 31/357; A61P 25/28
See application file for complete search history.

(56) References Cited

U.S. PATENT DOCUMENTS

2015/0342880 A1* 12/2015 Bannister ............. A61K 31/196 514/460

FOREIGN PATENT DOCUMENTS

| CN | 105147666 | A | * | 12/2015 | | |
|----|-----------|---|---|---------|-----|----|
| KR | 20170021657 | A | * | 2/2017 | ............ | A61K 31/357 |
| WO | WO-2010110747 | A1 | * | 9/2010 | ............ | A61K 31/357 |
| WO | WO-2017193824 | A1 | * | 11/2017 | ............ | A61K 31/357 |

OTHER PUBLICATIONS

Nunes-Tavares et al. Inhibition of Choline Acetyltransferase as a Mechanism for Cholinergic Dysfunction Induced by Amyloid-β Peptide Oligomers, (Journal of Biological Chemistry), Jun. 2012, pp. 19377-19385, [online], [retrieved on Feb. 28, 2024] (Year: 2012).*
Cai et al. Activation of mTOR: a culprit of Alzheimer's disease?, (Neuropsychiatric Disease and Treatment), Apr. 2015, pp. 1015-1030, [online], [retrieved on Feb. 28, 2024]. (Year: 2015).*
CN-105147666 Machine translation obtained from https://worldwide.espacenet.com/patent/search/family/054788954/publication/CN105147666A?q=CN105147666A (Year: 2015).*
Cai et al. Activation of mTOR: a culprit of Alzheimerâs disease?, (Neuropsychiatric Disease and Treatment), Apr. 2015, pp. 1015-1030. (Year: 2015).*
WO 2017193824 A1 Machine translation (Year: 2017).*
CN 105147666 A Machine translation (Year: 2015).*
Activation of mTOR: a culprit of Alzheimerâs disease?, (Neuropsychiatric Disease and Treatment), Apr. 2015, pp. 1015-1030. (Year: 2015).*
Nunes-Tavares et al. Inhibition of Choline Acetyltransferase as a Mechanism for Cholinergic Dysfunction Induced by Amyloid-$\hat{1}^2$ Peptide Oligomers, (Journal of Biological Chemistry), Jun. 2012, pp. 19377-19385. (Year: 2012).*
Park et al. GSK3$\hat{1}^2$-dependent inhibition of AMPK potentiates activation of neutrophils and macrophages and enhances severity of acute lung injury, Lung cellular and molecular physiology, Nov. 2014, pp. L735-L745 (Year: 2014).*
Yang et al. The AMPK-PPARGC1A pathway is required for anti-microbial host defense through activation of autophagy, Autophagy, May 2014, pp. 785-802 (Year: 2014).*
CN 105147666 Machine translation (Year: 2015).*
KR 20170021657 Machine translation (Year: 2017).*
KR 20170021657 A Machine Translation (Year: 2017).*
International search report of PCT Patent Application No. PCT/CN2018/113458 issued on Jul. 11, 2019.

* cited by examiner

*Primary Examiner* — Sarah Pihonak
*Assistant Examiner* — Mikhail O'Donnel Robinson
(74) *Attorney, Agent, or Firm* — Thomas Horstmeyer, LLP

(57) ABSTRACT

Disclosed is a use of artemether in preventing and treating Alzheimer's disease. Artemether is a safe and effective compound for treatment against malaria. Artemether activates an AMPK signaling pathway in the brain of a transgenic mouse model of Alzheimer's disease, improves learning and memory abilities in the mouse model, reduces neuron apoptosis in the brain, improves function of choline acetyltransferase, inhibits activity of glial cells, and reduces amyloid plaque deposition, neurofibrillary tangle, and neuron loss, thereby providing an experimental basis for clinical research on the treatment of Alzheimer's disease.

4 Claims, 16 Drawing Sheets

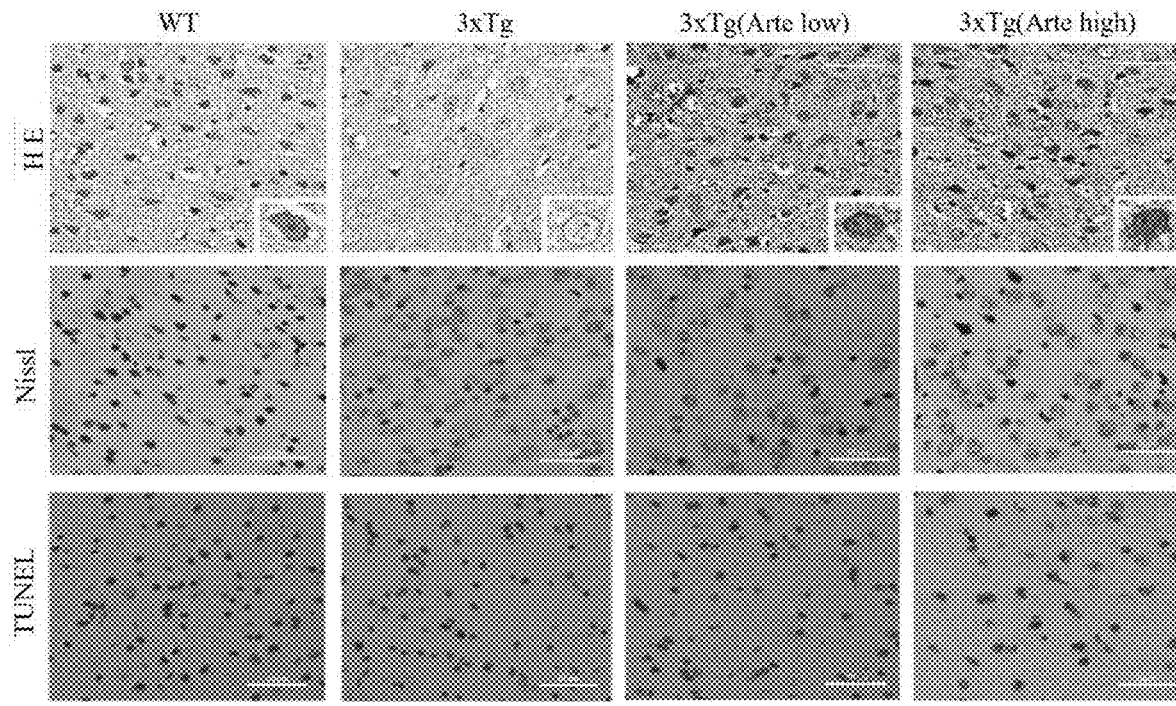
Fig.2A
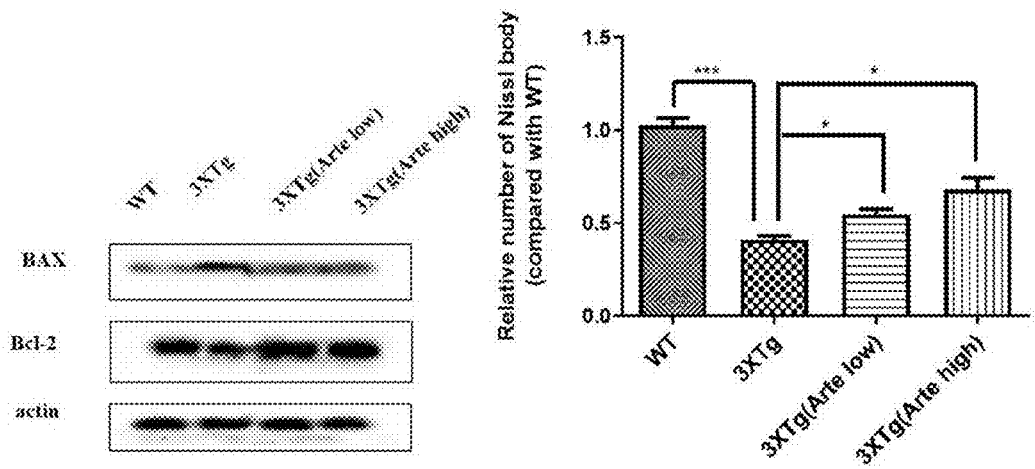
Fig.2B
Fig.2C

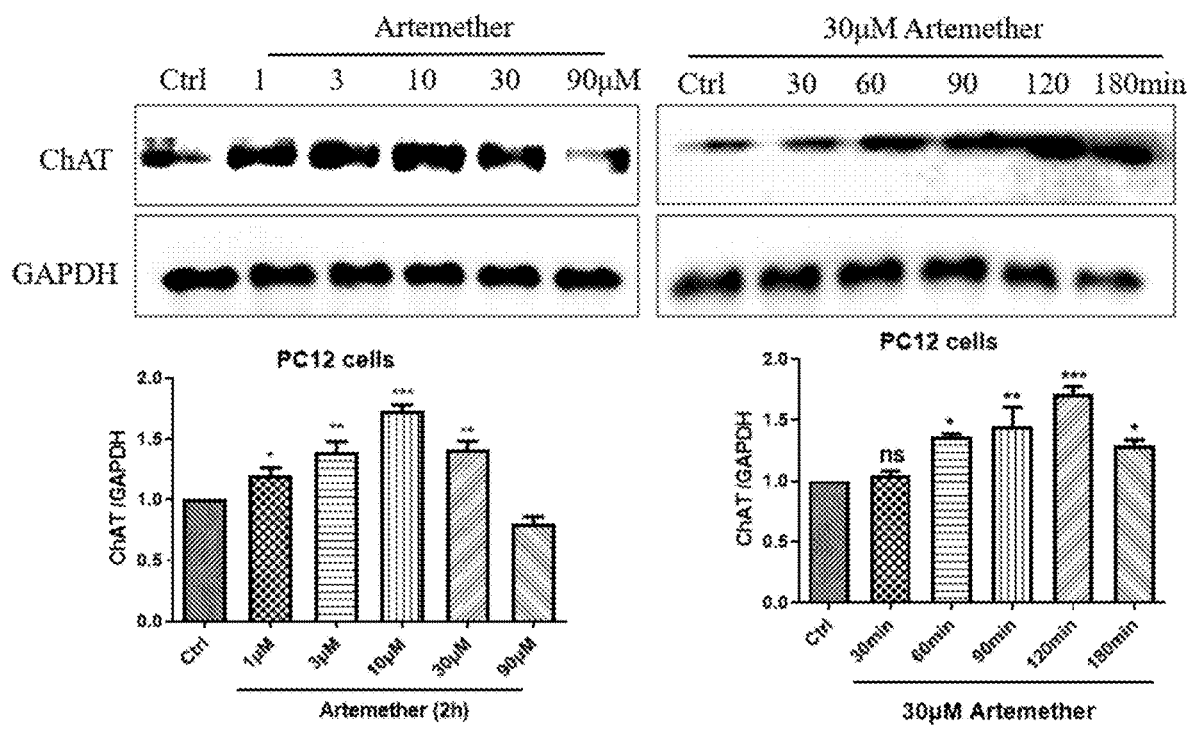
Fig.14A
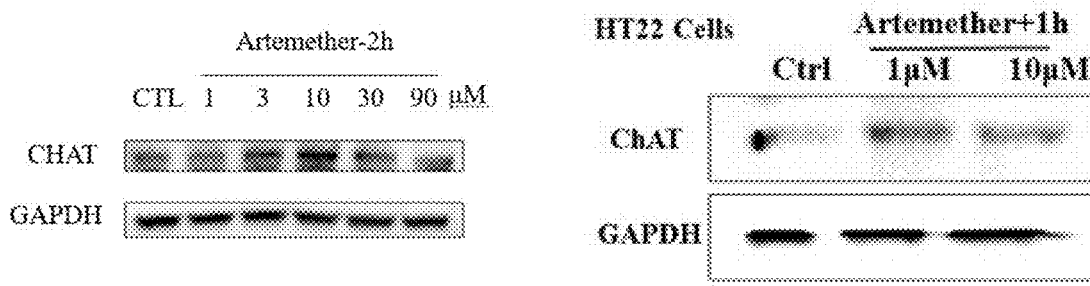
Fig.14B
Fig.14C

USE OF ARTEMETHER IN THE PREVENTION AND TREATMENT OF ALZHEIMER'S DISEASE

CROSS REFERENCE TO RELATED APPLICATIONS

This application is a Continuation-in-part Application of PCT Application No. PCT/CN2018/113458 filed on Nov. 1, 2018, which claims the benefit of Chinese Patent Application No. 201811169454.6 filed on Oct. 8, 2018. The contents of the above-identified applications are incorporated herein by reference in their entirety.

FIELD OF THE INVENTION

The invention relates to the application of traditional Chinese medicine monomers, in particular to the application of artemether in the prevention and treatment of Alzheimer's disease and other cholinergic dysfunction diseases and metabolic diseases.

BACKGROUND OF THE INVENTION

With the intensification of population aging, the impact of Alzheimer's disease (AD) is also rapidly expanding globally. Alzheimer's disease (AD) is the most common form of neurodegenerative diseases and is characterized by memory impairment, aphasia, apraxia, agnosia, executive dysfunction, behavioral changes, etc. Currently there are more than 40 million AD patients worldwide, and the number is expected to increase to 70 million by 2030, which will bring serious social and economic concerns. As the pathophysiology of AD is still unknown, there are still no safe and effective drugs for the treatment of AD patients.

The Morris water maze is widely used to assess learning and memory impairments, being the worldwide behavioral test of choice for the study of these parameters. Immunohistochemistry is a technique for the qualitative, localized, and quantitative determination of specific antigens through the use of antigen-antibody reaction and in situ histochemical color reaction with specific antibodies labeled with a chromogenic reagent. Immunohistochemistry has a very broad role in biomedical research. Western Blot is an experimental method commonly used in molecular biology, biochemistry and immunogenetics. It consists in the staining, with antibodies specific to the target protein of cells or biological tissue processed by gel electrophoresis. The information of the expression profile of a particular protein in the cell or tissue is obtained by analyzing the position and the intensity of the bands.

Artemisinin, a widely known antimalarial drug, has been reported to have multiple other effects, including anti-inflammatory, anti-apoptotic, anti-cancer, antibacterial and antiviral. Artemether, as a derivative of artemisinin, has similar biological effects, but its antimalarial activity has been reported to be higher than that of artemisinin. Moreover, its higher solubility facilitates the preparation of oil or water-based injections, being used in the clinic with more frequency. There are no reports of the use of artemether in the treatment of Alzheimer's disease.

SUMMARY OF THE INVENTION

The present invention describes the use of artemether in the treatment of Alzheimer's disease, cholinergic dysfunctions related diseases and metabolic diseases.

Choline acetyltransferase (ChAT) is a transferase enzyme responsible for the synthesis of the neurotransmitter acetylcholine (ACH). Increase of the activity of ChAT will increase the production of ACH and enhance the cholinergic functions. Therefore, stimulators (activators) of ChAT can be used in the prevention and treatment of cholinergic neurological dysfunction related diseases, such as aging, postoperative cognitive dysfunction, dementia, schizophrenia, Huntington's disease, autism, myasthenia gravis, hyperactivity, respiratory distress syndrome and abnormal immune functions (ACH receptors are also expressed in other tissues and cells including immune cells, endothelial cells, and epithelial cells).

Treatment of an experimental mice model of Alzheimer's disease with artemether improves their learning and memory abilities, improves oxidative damage, prevents neuronal loss and reduces amyloid plaque deposition and neurofibrillary tangles formation. Artemether also has the ability to improve the function of choline acetyltransferase and inhibit the activity of glial cells The technical solution adopted in the present disclosure is as follows:

In one aspect, the present disclosure provides:

A method for stimulating the activity of choline acetyltransferase, comprising treating cells/animals/human to stimulate choline acetyltransferase with sufficient amount of artemether.

In some embodiments, said method is used to increase the activity of choline acetyltransferase, increase the concentration of Acetylcholine and cholinergic neuronal function.

In some embodiments, said method is used for the treatment of diseases related to insufficiency of choline acetyltransferase activity, insufficiency of cholinergic neuronal function or diseases related to acetylcholine metabolism disorders.

In some embodiments, said method further comprising: detecting a patient with insufficiency of choline acetyltransferase activity or insufficiency of cholinergic neuronal function.

In some embodiments, said diseases related to insufficiency of choline acetyltransferase activity or insufficiency of cholinergic neuronal function comprise one or more selected from the group consisting of aging, postoperative cognitive dysfunction, dementia, schizophrenia, Huntington's disease, autism, myasthenia gravis, hyperactivity, respiratory distress syndrome and abnormal immune function of the body.

In some embodiments, said diseases related to acetylcholine metabolism disorders comprise one or more selected from the group consisting of aging, postoperative cognitive dysfunction, dementia, schizophrenia, Huntington's disease, autism, myasthenia gravis, hyperactivity, respiratory distress syndrome.

In some embodiments, the dosage of artemether is about 0.1 mg/kg body weight/day to about 20 mg/kg body weight/day.

In some embodiments, artemether is used at least once per day.

In another aspect, the present disclosure provides:

A method for the treatment of Alzheimer's disease and its concomitant diseases, comprising:
  detecting a patient with Alzheimer's disease and/or the concomitant diseases thereof;
  treating the patient with artemether at a dosage ranging from about 0.1 mg/kg body weight/day to about 20 mg/kg body weight/day.

In some embodiments, artemether is administered by injection or orally.

In some embodiments, the concomitant diseases of Alzheimer's disease comprise the decline in learning and memory abilities.

In some embodiments, artemether is used at least once per day.

In another aspect, the present disclosure provides:

A method for increasing the phosphorylation of AMPK and GSK-3β (ser9), comprising treat AMPK and GSK-3β (ser9) with sufficient amount of artemether.

In some embodiments, said method is used for the treatment of diseases related to insufficiency of AMPK phosphorylation and GSK-3β (ser9) phosphorylation.

In some embodiments, said diseases comprise one or more selected from the group consisting of diabetes, obesity, aging, lifespan and/or lifespan-related diseases, asthma, chronic obstructive pulmonary disease (COPD), pulmonary infectious diseases and pulmonary fibrosis, said method further comprising: detecting a patient with insufficiency of AMPK phosphorylation and GSK-3β (ser9) phosphorylation.

In some embodiments, the dosage of the artemether is about 0.1 mg/kg body weight/day to about 20 mg/kg body weight/day.

In some embodiments, the dosage of the artemether is about 0.1 mg/kg body weight/day to about 20 mg/kg body weight/day.

In some embodiments, artemether is used at least once per day.

The use of artemether in the preparation of drugs for the prevention and/or treatment of Alzheimer's disease.

The use of artemether in the preparation of drugs to alleviate the learning and memory decline in Alzheimer's disease.

The use of artemether in the preparation of drugs that inhibit the activity of glial cells.

In some embodiments, wherein glial cells are astrocytes.

The use of artemether in the preparation of antioxidant drugs for Alzheimer's disease.

In some embodiments, the antioxidant drugs for Alzheimer's disease are drugs that can reduce oxidative substances and/or increase the content of antioxidant substances in the brain.

In some embodiments, wherein the oxidizing substance is malondialdehyde.

In some embodiments, wherein the antioxidant substances in the brain are at least one of superoxide dismutase, Nrf2 and heme oxygenase-1.

The use of artemether in the preparation of drugs for inhibiting neuronal apoptosis in Alzheimer's disease.

The use of artemether in the preparation of drugs to reduce the neurotoxicity induced by Afβ1-42.

The use of artemether in the preparation of drugs to inhibit the expression of neuronal apoptosis-related proteins in Alzheimer's disease.

The use of artemether in the preparation of drugs for improving amyloid plaque deposition or/and reducing neurofibrillary tangles.

A drug formulation for the prevention and/or treatment of Alzheimer's disease, wherein the active ingredient comprises artemether.

The use of artemether in the preparation and treatment of drugs for cholinergic neurological dysfunction related diseases, such as aging, postoperative cognitive dysfunction, dementia, schizophrenia, Huntington's disease, autism, myasthenia gravis, hyperactivity, respiratory distress syndrome, etc.

The use of artemether in the preparation of drugs for infectious diseases such as respiratory distress syndrome, regulation of cholinergic inflammatory pathways and abnormal immune function of the body.

The use of artemether in the preparation of drugs for diseases related to low AMPK phosphorylation and GSK3β phosphorylation (Ser9), such as diabetes, obesity and other metabolic diseases.

The use of artemether in the preparation of drugs for diseases related to low AMPK phosphorylation and GSK3β phosphorylation (Ser9) such as aging, lifespan and/or lifespan-related diseases.

The use of artemether in the preparation of drugs for diseases related to low AMPK phosphorylation, such as asthma associated lung tissue damage, chronic obstructive pulmonary disease (COPD), pulmonary infectious diseases, and pulmonary fibrosis.

The beneficial effects of the present invention are:

Artemether treatment of a transgenic mice model of Alzheimer's disease improves the learning and memory abilities, improves oxidative damage, inhibits apoptosis, improves the activity of choline acetyltransferase and cholinergic dysfunction related diseases, inhibits the activity of glial cells, inhibits inflammatory pathways and inflammation related diseases, reduces amyloid plaque deposition and nerve fiber entanglement, providing an experimental basis for its clinical application on Alzheimer's disease. These findings also indicate the potential application of artemether in the prevention/treatment of Alzheimer's disease.

BRIEF DESCRIPTION OF THE FIGURES

(FIG. 1A) Effect of artemether on the escape latency; (FIG. 1B) Effect of artemether on the percentage of time spent in the target quadrant. Animals were divided into 4 experimental groups: wild type group (WT) (given the same amount of normal saline), model group (3xTg AD mice) (given the same amount of normal saline), model group+artemether 5 mg/kg (arte low), model group+artemether 20 mg/kg (arte high). The results show that artemether improved the learning and memory abilities of AD mice (3xTg-AD). 3xTg mice in the figure represents 3xTg AD mice in the specification and arte refers to artemether.

FIG. 2A~FIG. 2D Artemether attenuates cell damage and apoptosis in the cerebral cortex of 3xTg-AD mice. (FIG. 2A) Cell morphology changes were detected by H&E staining, neuronal cell viability was checked by Nissl staining, and terminal deoxynucleotide transfer UTP nick end labeling (TUNEL) assay was used to determine apoptotic cell death in the cortex; (FIG. 2B) Western blot results of Bax and Bcl-2 in each group; (FIG. 2C) and (FIG. 2D) are relative to the quantification and statistical analysis of Nissl staining and TUNEL assay, respectively. The results show that artemether attenuated cell damage and apoptosis in the cerebral cortex of 3xTg-AD mice. 3xTg mice in the figure represents 3xTg AD mice in the specification.

(FIG. 4A) Immunohistochemistry of ChAT; (FIG. 4B) Quantification and statistical analysis of ChAT positive neurons. The results show that artemether treatment increased ChAT activity in the brain in a concentration-dependent manner. The ChAT intensity represents the content of ChAT. 3xTg mice in the figure represents 3xTg AD mice in the specification, the ChAT intensity represents the content of ChAT.

(FIG. 6A, FIG. 6B) Artemether reduced the expression of GFAP-positive cells in the brain of 3xTg AD mice, indicating that it can inhibit the activity of astrocytes; (FIG. 6C) Artemether reduced the expression levels of the inflammatory factors IL-18 and NF-KB in the brains of 3xTg AD mice, indicating its anti-inflammatory effect. 3xTg mice in the figure represents 3xTg AD mice in the specification, and the astrocytes expression compared with WT represents astrocyte expression levels relative to the WT.

(FIG. 9A) Protein expression levels of AMPK, p-AMPK, GSK-3β and p-GSK-3β (ser9), Nrf2, heme oxygenase-1 (HO-1); (FIG. 9B, FIG. 9C, FIG. 9D, FIG. 9E) Quantification and statistical analysis of A. 3xTg mice in the figure represents 3xTg AD mice in the specification, phosphorylation of AMPK represents the phosphorylation of AMPK, phosphorylation of GSK3β(ser9) represents the phosphorylation of GSK3β(ser9), relative protein expression of Nrf2 represents the relative protein expression of protein Nrf2 compared with the control group, and relative protein expression of HO-1 represents the relative expression of HO-1 compared with the control group.

FIG. 10A, FIG. 10B, FIG. 10C: MTT assay was used to detect the cell viability of neuronal cells pretreated with different concentrations of artemether or untreated followed by incubation with 1 μM $A\beta_{1-42}$. The results show that artemether conferred neuroprotection to PC12 cells, SH-SY5Y human neuroblastoma cells and mouse primary neural cell cultures, which are commonly used cell models in neurobiological research.

(FIG. 11A, FIG. 11C) PC12 cells were pretreated with different concentrations of artemether followed by incubation with 1 μM $A\beta_{1-42}$. Phosphorylated AMPK (P-AMPK) and total AMPK (T-AMPK), GSK3β phosphorylation (ser9) (P-GSK3β), total GSK3β (T-GSK3β) and GAPDH were detected by western blotting; (FIG. 11B, FIG. 11D) Quantification of the protein bands in A and C. The results show that artemether treatment increased the ratio of AMPK and GSK-3β (ser9) phosphorylation in PC12 cells.

(FIG. 12A) PC12 cells were pretreated with AMPK inhibitor compound C in the presence or absence of artemether and treated with $A\beta_{1-42}$ (1 μM) for 24 hours. Cell viability was measured by MTT; (FIG. 12B) PC12 cells were pretreated with AMPK inhibitor compound C, exposed to $A\beta_{1-42}$ (1 μM) with or without artemether pretreatment, and the cell apoptosis of each group was determined by flow cytometry. The results show that compound C significantly reversed the protective effect of artemether on $A\beta_{1-42}$ induced cell apoptosis. (FIG. 12C) Quantification of the percentage of apoptosis in B, showing that compound C significantly inhibits the protective effect of artemether. (FIG. 12D) Western blot analysis of T-AMPK, P-AMPK, GSK3β and P-GSK3β (ser9) shows that compound C reversed the phosphorylation of AMPK and GSK3β (ser9) induced by artemether. GAPDH was used as internal control. (FIG. 12E, FIG. 12F) Ratios of p-AMPK/GAPDH and P-GSK3β (ser9)/GAPDH, showing that compound C inhibits the induction of AMPK and GSK3β (ser9) phosphorylation/activity by artemether.

FIG. 14A~FIG. 14C. Artemether increased the expression levels of choline acetyltransferase (ChAT) in multiple cell types including Neuronal PC12/Hippocanpal neuronal cells HT22/Epithelial D407 cells. ChAT is a marker of cholinergic neurons. Western blot was used to test the expression of ChAT in PC12/HT22/D407 cells after treatment with artemether. The results show that artemether increased ChAT expression levels in PC12 (FIG. 14A)/D407 (FIG. 14B)/HT22 (FIG. 14C) cells.

DETAILED DESCRIPTION OF THE INVENTION

Figure 1A:
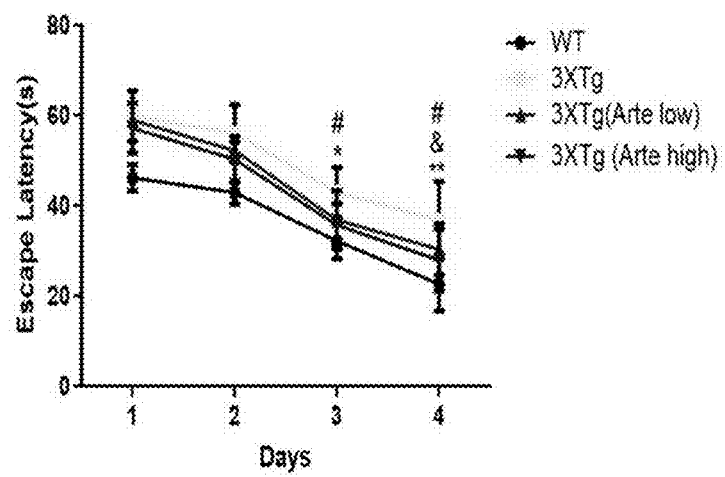
FIG. 1A~1B. Artemether improves the learning and memory abilities of AD mice (3xTg-AD).

The present invention will be further described in conjunction with the embodiments below.

Embodiment 1: The Effect of Different Doses of Artemether on the Learning and Memory Impairments Alzheimer's disease transgenic model mice (3xTg AD) were grown until 12-months-old. The mice were then daily injected intraperitoneally for 4 weeks with different concentrations of artemether. At the end of the treatment the Morris water test was performed, and the brains were collected for follow-up experiments.

12-months-old Alzheimer's disease transgenic mice (n=40) were divided into 4 groups (10 animals per group). The animals from the drug treatment groups received daily intraperitoneal injections of artemether for 1 month. Their body weight was measured before each administration in order to calculate artemether dosage. After this period, the Morris water maze test was performed. This test consists of a circular pool of 120 cm in diameter and 40 cm in height and a movable platform located in a pool divided into four quadrants and with the wall marked by four equidistant marking points that serve as the entry points for mice. During the experiment, the water temperature was kept constant, and the temperature maintained at 22-26° C. One hour before the experiment, the mice were placed in the laboratory where the water maze was placed to allow them to adapt to the environment. From the first to the fourth days of the water maze experiment, mice were given a place navigation test, and on the fifth day the spatial probe test was performed. When performing the place navigation experiment, the platform is placed in the middle of one of the quadrants, about 1 cm below the water surface. An experiment was conducted every morning to record the time the mice took to find the platform, which corresponds to the escape latency. At the beginning of each trial, the mice were placed at one of the four quadrants. Each mouse was subjected to four trials with a duration of 60 s. If the mice were able to locate the platform within the 60 s, they could rest on the platform for 10 s; if the platform was not found within 60 s, the experimenter guided the animals to the platform to also rest for 10 s and the escape latency was registered as 60 s. The time and movement route taken to find the platform were recorded by a video and software acquisition system. The above procedure was repeated in the subsequent 4 days. The average escape latency measured on the fourth day of the navigational experiments was counted as an indicator of the animals learning ability. 24 hours after the end of the navigation test, the platform hidden under the water was withdrawn and the space exploration experiment was carried out. The mice were placed in the pool at a water inlet point away from the platform, and the mice's trajectories were recorded during 60 s. The number of crosses and the residence time of the mice on the quadrant where the platform was previously located were determined to measure the spatial positioning and memory abilities of the mice. All data acquisition and processing were done by the Morris water maze image automatic monitoring and processing system.

Figure 1B:
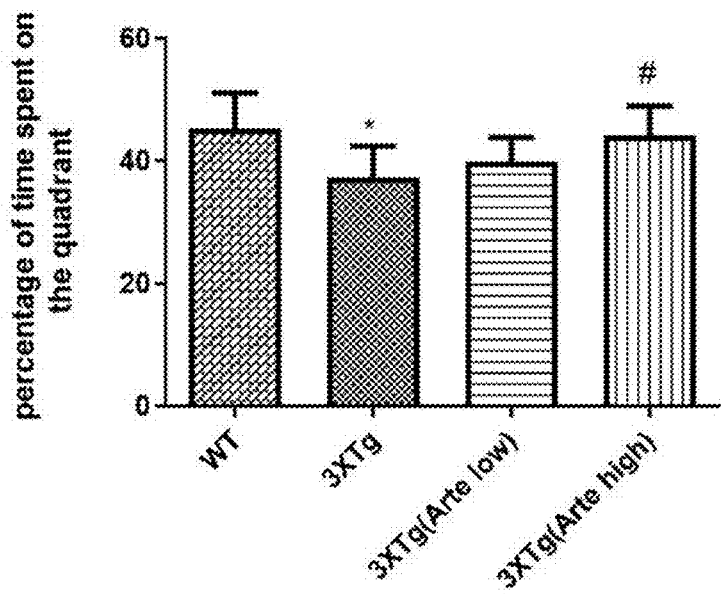

Results: FIG. 1A-FIG. 1B shows that the average escape latency of the mice gradually decreased with the extension of training time, indicating that the mice developed memories of the position of the underwater platform after training. The escape latency of 3xTg AD mice was longer than that of WT mice, and the escape latency of mice treated with artemether was shorter than that of 3xTg AD group (FIG. 1A). The results of the spatial probe test showed that the percentage of time spent in the target quadrant by 3xTg AD mice treated with artemether was significantly higher compared to untreated mice. The results show that artemether can improve the learning and memory abilities of AD mice (FIG. 1B).

Embodiment 2: Effect of Different Doses of Artemether on Neuronal Cell Morphology and apoptosis in the brain of a transgenic mouse model of Alzheimer's disease (3xTg AD) 12-month-old Alzheimer's disease transgenic mice (n=40) were divided into 4 groups (10 animals per group). The animals from the drug treatment groups received daily intraperitoneal injections of artemether for 1 month. Their body weight was measured before each administration in order to calculate artemether dosage. After this period, the mice were decapitated and the brain tissues were fixed, embedded, and sliced for later use. The mice in each group were perfused with normal saline to clear the blood, the whole brains were quickly collected on ice, fixed with paraformaldehyde for 24 hours and embedded in conventional dehydrated transparent paraffin (70% ethanol 2 h, 80% ethanol 2 h, 90% ethanol for 1 h, 95% ethanol for 1 h, 100% ethanol I for 30 min, 100% ethanol II for 30 min, xylene I for 10 min, xylene II for 10 min, soft wax for 1 h, hard wax for 1 h). The wax blocks were then coronally sectioned in 5 μm thickness slices.

2.1 Hematoxylin-eosin (HE) staining: The paraffin sections were subjected to conventional dewaxing and hydration. This was followed by immersion in hematoxylin (4 min), tap water wash, eosin (1 min), dehydration, and transparency as follows: 95% ethanol (5 min), 100% ethanol I (5 min), 100% ethanol II (5 min), xylene (5 min). The slides were mounted with neutral gum and the staining results were observed under a microscope.

2.2. Nissl Staining: The paraffin sections were subjected to conventional deparaffinization and hydration. This was followed by immersion in Nissl staining solution (15-20 min) and in 95% ethanol for a few seconds for color separation. Afterwards, the slides were conventionally dehydrated, transparent, and mounted with neutral gum. The staining results were observed under a microscope.

2.3 TUNEL (terminal deoxynucleotidyl transferase-mediated dUTP nick end labeling assay): The paraffin sections were routinely dewaxed and hydrated, and then immersed in 0.01M citrate buffer solution for antigen retrieval. The slides were then incubated with 3% $H_2O_2$ in deionized water for 12 min to inhibit the endogenous peroxidase activity followed by washing with phosphate-buffered saline (PBS) (3 min×3 times). TUNEL reaction solution was added dropwise and the slides were placed at 37° C. for 90 minutes. After this period, the slides were rinsed with PBS (5 min×3 times) and 0.1-0.3 ml labeled reaction stop solution was added followed by incubation at room temperature for 10 minutes. The slides were then rinsed with PBS (5 min×3 times) and streptavidin HRP working solution was added followed by incubation at room temperature for 30 minutes, rinsing with PBS (5 min×3 times), and 3'-diaminobenzidine (DAB) was added for color development. The slide was then observed under a microscope to check the color development degree after which the reaction was stopped with distilled water. Hematoxylin counterstain was performed for 3-5 min. The slides were rinsed thoroughly with tap water and mounted with neutral gum.

2.4 Western Blot Analysis: Each group of mice were sacrificed, intact brains were collected and the olfactory bulb was removed. The brain tissue was fully cut on ice and put into the lysis solution containing 100 μL of PMSF per 10 mL of RIPA at a concentration of 100 mM, phosphatase and protease inhibitors cocktail. After mixing well and placing on ice for 20 minutes, the brain tissues in the lysis solution were homogenized with a grinding rod on ice. Lysed samples were centrifuged at 12000 rpm, 4° C. for 15 min, and the protein concentration of the supernatant was used for Western Blot analysis and the expression levels of Bax and Bcl2 proteins were detected.

Figure 2D:
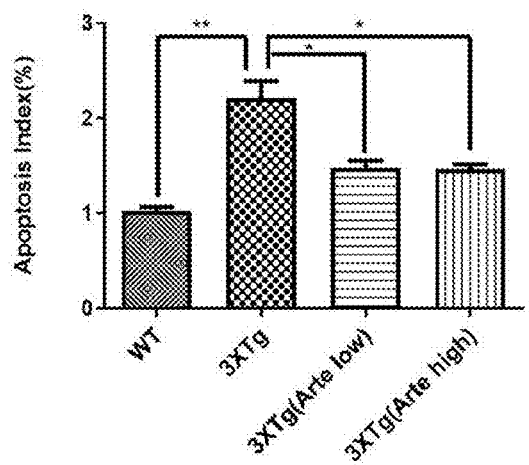

FIG. 2A~FIG. 2D show the morphology, number of Nissl bodies and apoptosis of neurons in the brains of mice in each group. Artemether improved the vacuolar degeneration of neurons in the cortex of 3xTg AD mice (FIG. 2A), increased the number of Nissl bodies (FIG. 2A, FIG. 2C), significantly reduced apoptosis in the cortex of 3xTg AD mice (FIG. 2A, FIG. 2D) and decreased the ratio of Bax/Bcl2 (FIG. 2B).

Embodiment 3: Effect of Different Doses of Artemether on the Number of Neurons in the Brain of a Transgenic Mouse Model of Alzheimer's Disease (3xTg AD)

12-month-old Alzheimer's disease transgenic mice (n=40) were divided into 4 groups (10 animals per group). The animals from the drug treatment groups received daily intraperitoneal injections of artemether for 1 month. Their body weight was measured before each administration in order to calculate artemether dosage. After this period, the mice were decapitated and the brain tissues were fixed, embedded, and sliced for later use.

The specific implementation method is as follows:

The mice were perfused with normal saline to clear the blood and then sacrificed. The brains were then quickly dissected on ice, fixed in paraformaldehyde for 24 hours, dehydrated by sucrose gradient and embedded in OCT. Afterwards the samples were coronally sectioned in 10 μm thickness slices using a cryostat.

The frozen sections were fixed in acetone and then immersed in 0.01M citrate buffer solution for antigen retrieval. The slides were then washed with PBS (3 min×3 times) and incubated with diluted primary antibody overnight at 4° C. The next day, the slides were rinsed with PBS (5 min×3 times) and incubated with secondary antibody at room temperature for 60 minutes. After rinsing with PBS (5 min×3 times), DAPI was added in order to stain the nucleus and slides were mounted. The GFAP is a marker of astrocytes, which can be used to evaluate the effect of artemether on the activity of astrocytes (glial cells) in the brain of 3xTg mice.

Figure 3:
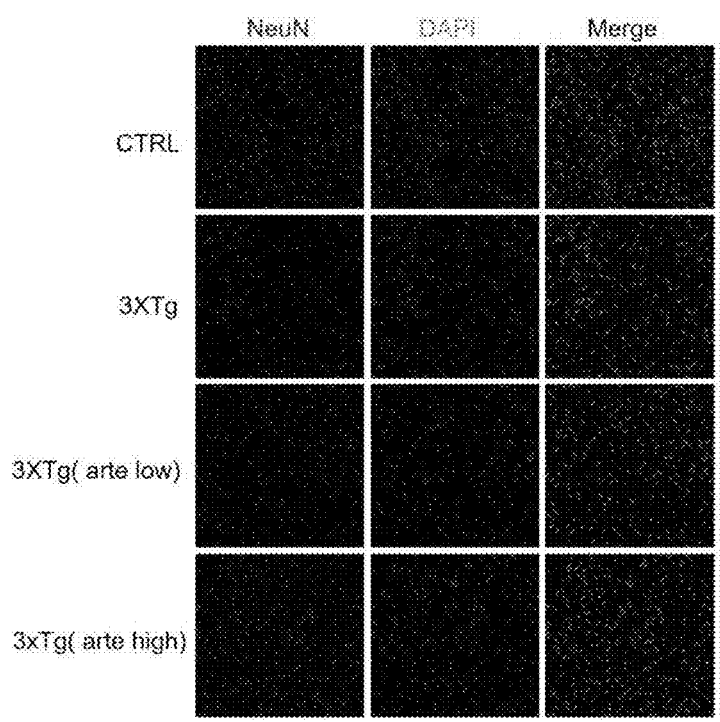
FIG. 3. Artemether concentration-dependently increases the number of neurons in the cerebral cortex of 3xTg AD mice. NeuN is a neuronal marker, so it was used to detect the effect of artemether on the number of neurons in the brain of 3xTg AD mice. Our results show that the number of neurons in the cerebral cortex of 3xTg AD mice decreased, and artemether treatment increased the number of neurons in the brain of 3xTg AD mice. 3xTg mice in the figure represents 3xTg AD mice in the specification.

Results: FIG. 3 shows NeuN staining (neuron-specific staining) of cortical neurons in each group. The results show that the number of neurons in the cerebral cortex of aged 3xTgAD mice decreased, and artemether treatment increased the number of neurons.

Embodiment 4: Effect of Different Doses of Artemether on Choline Acetyltransferase and Neurogenesis in the Brain of a Transgenic Mouse Model of Alzheimer's Disease (3xTg AD)

12-month-old Alzheimer's disease transgenic mice (n=40) were divided into 4 groups (10 animals per group). The animals from the drug treatment groups received daily intraperitoneal injections of artemether for 1 month. Their body weight was measured before each administration in order to calculate artemether dosage. After this period, the mice were decapitated and the brain tissues were fixed, embedded, and sliced for later use.

The specific implementation method is as follows:

The mice were perfused with normal saline to clear the blood and then sacrificed. The whole brains of the mice were then quickly dissected on ice, fixed with paraformaldehyde for 24 hours and embedded in conventional dehydrated transparent paraffin (70% ethanol 2 h, 80% ethanol 2 h, 90% ethanol for 1 h, 95% ethanol for 1 h, 100% ethanol I for 30 min, 100% ethanol II for 30 min, xylene I for 10 min, xylene II for 10 min, soft wax for 1 h, hard wax for 1 h). The wax blocks were then coronally sectioned in 5 μm thickness slices.

The paraffin sections were routinely dewaxed and hydrated, and then immersed in 0.01M citrate buffer solution for antigen retrieval. The slides were then incubated with 3% $H_2O_2$ in deionized water for 12 min to inhibit the endogenous peroxidase activity followed by washing with PBS (3 min×3 times). After incubation with 10% BSA blocking solution for 1 hour, the slides were incubated with diluted primary antibody overnight at 4° C. On the next day, the slides were rinsed with PBS (5 min×3 times) and incubated with secondary antibody at room temperature for 60 minutes followed by DAB for color development. The slides were then observed under a microscope to check the color development degree after which the reaction was stopped with distilled water. After conventional dehydration the slides were mounted with neutral gum and observed under a microscope.

Figure 4A:
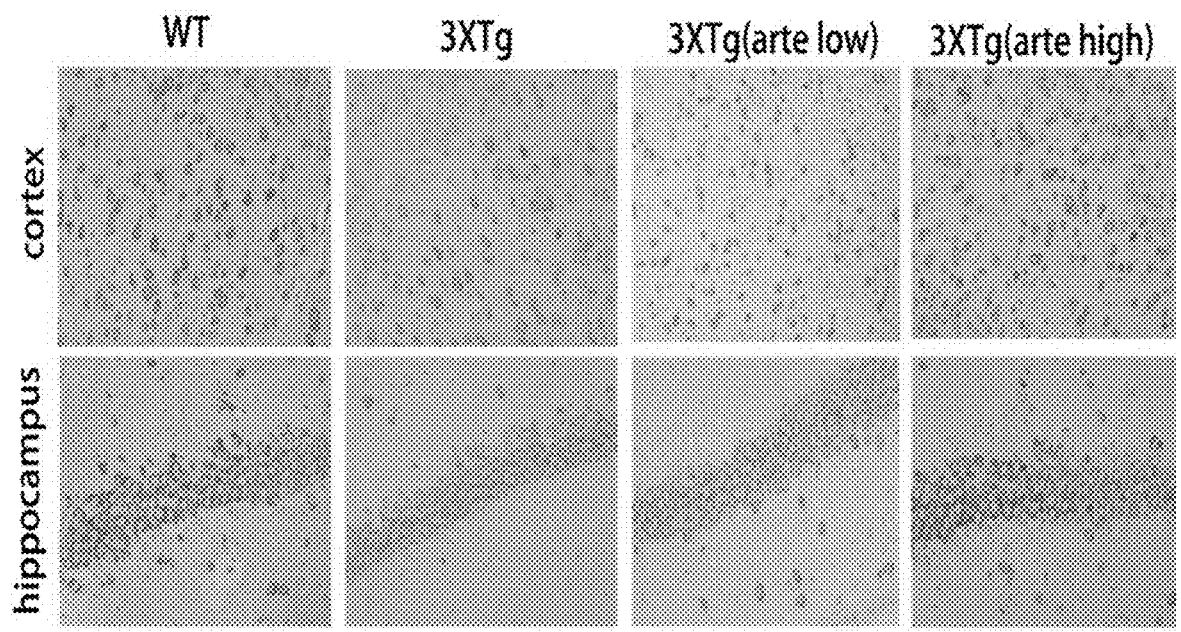
FIG. 4A~FIG. 4B. Artemether increases the expression levels of choline acetyltransferase (ChAT) in the brain of 3xTg AD mice. ChAT is a marker of cholinergic neurons and can be used to evaluate the function of cholinergic neurons in the brain.
Figure 4B:
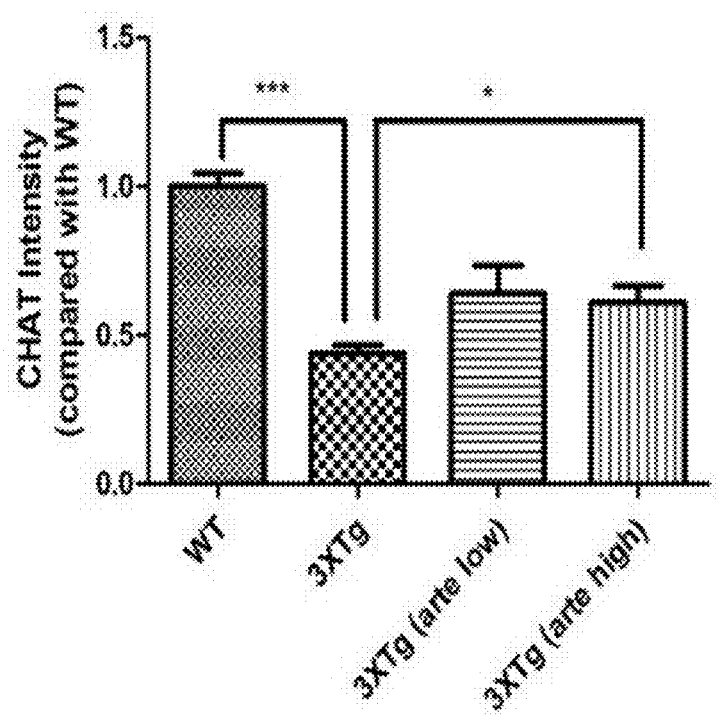

Results: FIG. 4A-FIG. 4B show the expression of choline acetyltransferase (ChAT) in the brain of each group, indicating that artemether increased the number of ChAT positive cells in the brain of the Alzheimer's disease transgenic mouse model (3xTg AD) in a concentration dependent manner.

Embodiment 5: Effect of Different Doses of Artemether on Neurogenesis in the Brain of a Transgenic Mouse Model of Alzheimer's Disease (3xTg AD)

The method is the same as in Embodiment 4.

Figure 5:
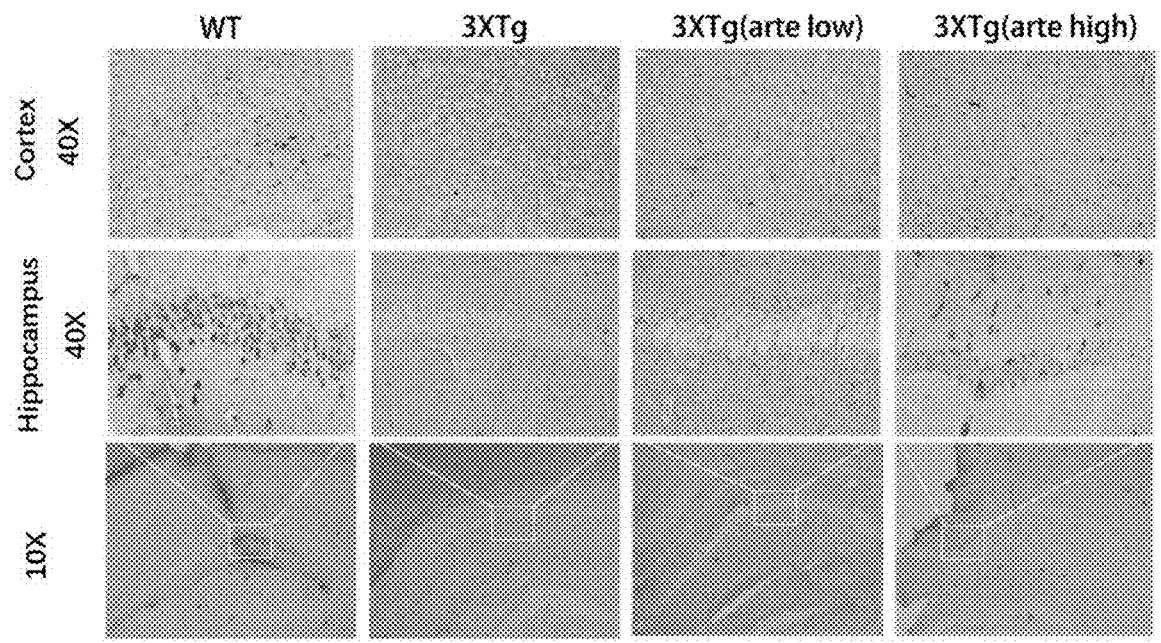
FIG. 5. Artemether enhances neurogenesis in the brains of 3xTg AD mice. Nestin is a molecular biomarker of embryonic and adult neural stem cells, which can be used to evaluate the effect of artemether on the neurogenesis/regeneration ability (immunohistochemistry of Nestin). The results show that the neurogenesis of aged 3xTg AD mice was reduced (decreased neurogenesis/regeneration capacity), while artemether increased neurogenesis in the brains of 3xTg AD mice. 3xTg mice in the figure represents 3xTg AD mice in the specification.

Results: FIG. 5 shows that artemether enhanced neurogenesis in the brains of 3XTg AD mice. Nestin is a molecular biomarker of embryonic and adult neural stem cells, which can be used to evaluate the effect of artemether on the neurogenesis/regeneration ability. The results show that aged 3XTg AD mice exhibited a marked neurogenesis reduction that was increased in the 3XTg AD mice groups treated with artemether.

Embodiment 6: Effect of Different Doses of Artemether on the Activation of Glial Cells in the Brain of a Transgenic Mouse Model of Alzheimer's Disease (3xTg AD)

The method is the same as in Embodiment 3 or Embodiment 2.4.

Figure 6A:
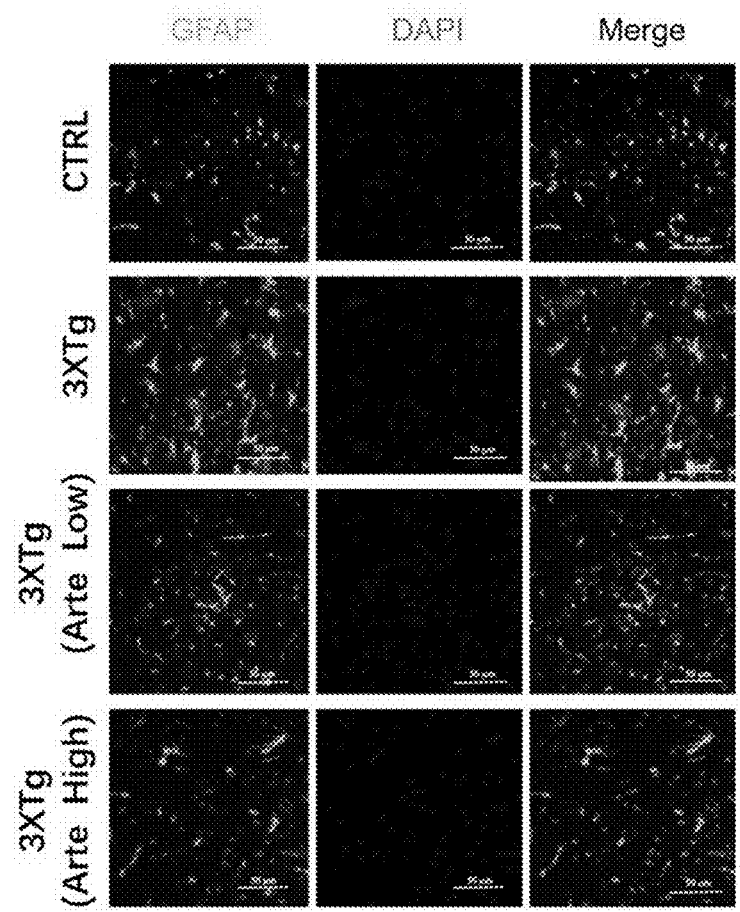
FIG. 6A~FIG. 6C. Artemether inhibits the activity of astrocytes in 3xTg AD mice and has anti-inflammatory effects. GFAP is a marker of astrocytes and can be used to evaluate the effect of artemether on the activity of astrocytes (glial cells) in the brain of 3xTg AD mice. Many activated GFAP-positive cells were observed in 3xTg AD mice.
Figure 6B:
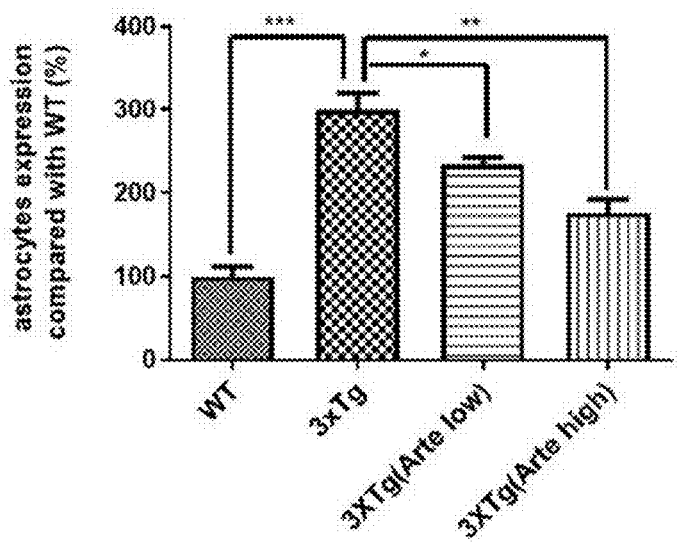
Figure 6C:
Figure 7A:
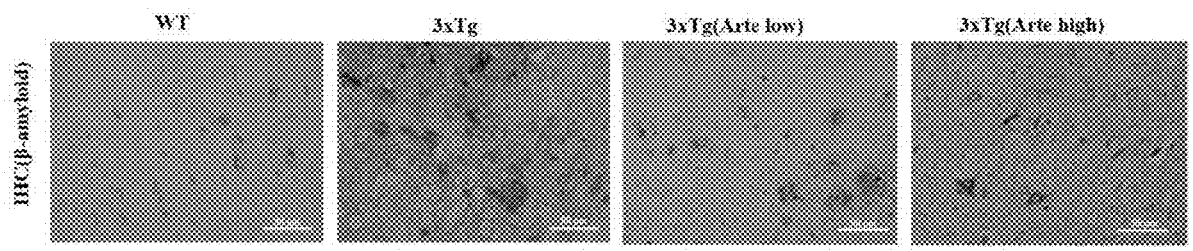
FIG. 7A~FIG. 7F. Artemether reduces AD deposition and Tau phosphorylation in 3xTg AD mice. Immunohistochemistry and Congo red staining of Aβ and p-tau (marking amyloidosis) (FIG. 7A); Western blot of β-amyloid and phosphorylated Tau in each group (FIG. 7B); Quantification and statistical analysis of the Western blot of β-amyloid and phosphorylation of Tau results (FIG. 7C, FIG. 7D, FIG. 7E, FIG. 7F). The results show that AP deposition and phosphorylation of Tau protein in the brains of aged 3xTg AD mice were significantly increased, while artemether significantly reduced the expression of these two protein markers. 3xTg mice in the figure represents 3xTg AD mice in the specification, and phosphorylation of Tau represents the phosphorylation of the Tau protein.
Figure 7B:
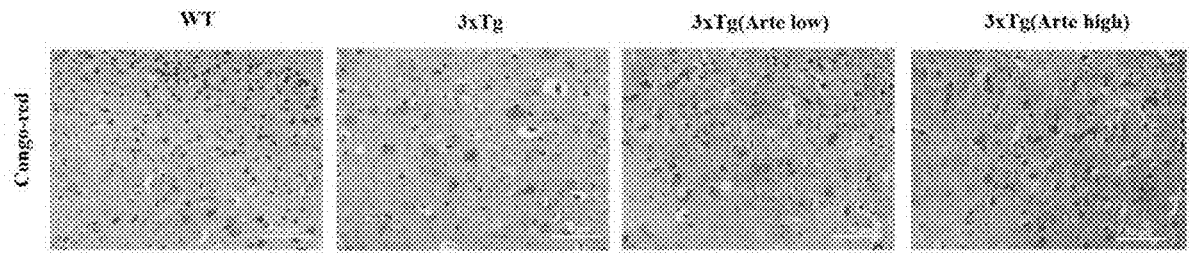
Figure 7C:
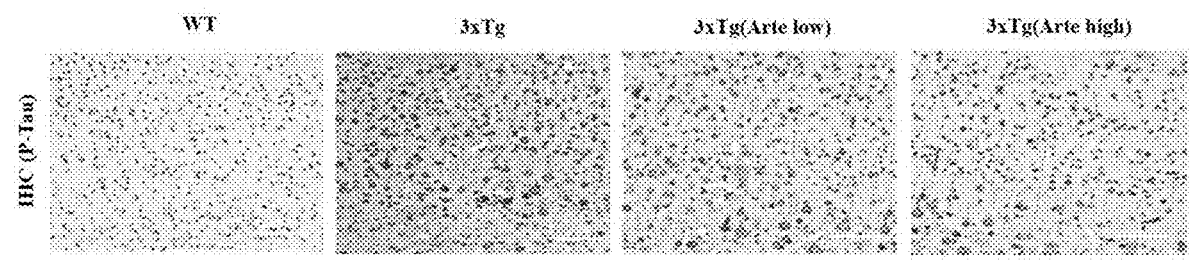
Figure 7D:
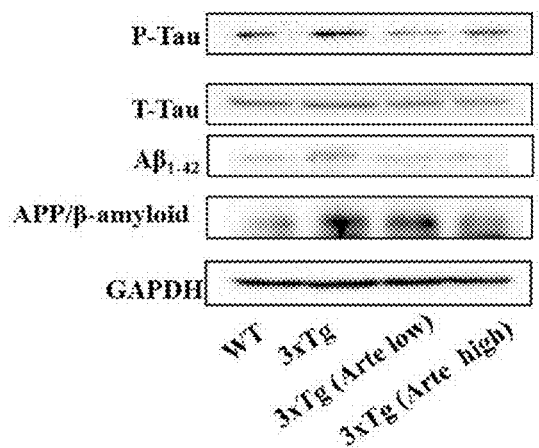
Figure 7E:
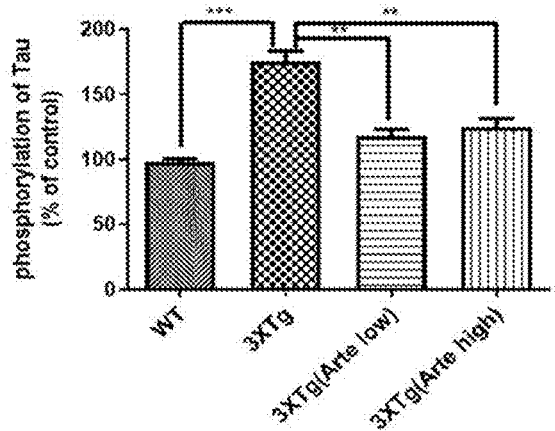
Figure 7F:
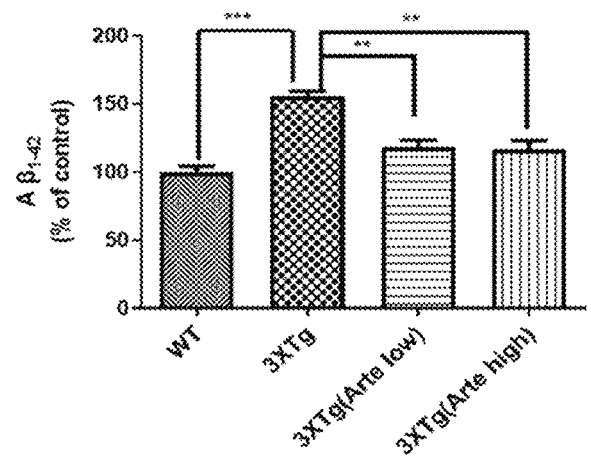

Results: FIG. 6A-'FIG. 6C shows that artemether inhibited the activity of astrocytes in 3XTg AD mice and has an anti-inflammatory effect. GFAP is a marker of astrocytes and can be used to evaluate the effect of artemether on the activity of astrocytes (glial cells) in the brain of 3xTg AD mice (FIG. 6A, FIG. 6B) GFAP immunofluorescence staining. Artemether reduced the expression of GFAP-positive cells in the brain of 3xTg AD mice, indicating that it can inhibit the activity of astrocytes; (FIG. 6C) Western Blot analysis of IL-18 and NF-ΚB expression. Artemether reduced the expression levels of the inflammatory factors IL-18 and NF-ΚB in the brains of 3xTg AD mice, indicating its anti-inflammatory effect.

Embodiment 7: Effect of Different Doses of Artemether on Amyloid Plaque Deposition and Tau Phosphorylation in the Brain of a Transgenic Mouse Model of Alzheimer's Disease (3xTg AD)

12-month-old Alzheimer's disease transgenic mice (n=40) were divided into 4 groups (10 animals per group). The animals from the drug treatment groups received daily intraperitoneal injections of artemether for 1 month. Their body weight was measured before each administration in order to calculate artemether dosage. After this period, the mice were decapitated and the brain tissues were fixed, embedded, and sliced for later use.

The specific implementation method is as follows:

Congo red staining: After conventional deparaffinization and hydration, the slides were dipped in Congo red dye for 10 min-20 min, immersed in alkaline ethanol differentiation solution for a few seconds, counterstained in hematoxylin for 2 min and rinsed thoroughly with tap water. The slides were then conventionally dehydrated, cleared, mounted with neutral gum and observed under a microscope. The other steps are the same as in Embodiment 4 and embodiment 2.4.

Results: FIG. 7A~FIG. 7F shows the deposition of amyloid plaques and neurofibrillary tangles in each group. Artemether treatment reduced the deposition of Aβ (FIG. 7A and FIG. 7F) and Tau protein phosphorylation in the cortex of 3xTg AD mice. Quantification of the Western Blot results (FIG. 7B-FIG. 7D), confirm that artemether reduced the deposition of Aβ (FIG. 7A and FIG. 7F) and Tau protein phosphorylation in the cortex of 3xTg AD mice.

Embodiment 8: Effect of Different Doses of Artemether on the Oxidative Stress of a Transgenic Mouse Model of Alzheimer's Disease (3xTg AD)

12-month-old Alzheimer's disease transgenic mice (n=40) were divided into 4 groups (10 animals per group). The animals from the drug treatment groups received daily intraperitoneal injections of artemether for 1 month. Their body weight was measured before each administration in order to calculate artemether dosage. After this period, the mice were decapitated and the brain tissues were collected and total protein was extracted. Then MDA (malondialdehyde) and SOD (superoxide dismutase) tests were performed to detect the level of artemether antioxidant indicators.

The specific implementation method is as follows:

At the end of the experiment the mice were decapitated, and the brain tissues were collected, washed with cold PBS and lysed in radio immunoprecipitation assay (RIPA) buffer containing phosphatase and protease inhibitors cocktail. Lysed samples were centrifuged at 12000 rpm, 4° C. for 15 min, and the supernatant was tested to detect SOD and MDA levels.

Figure 8A:
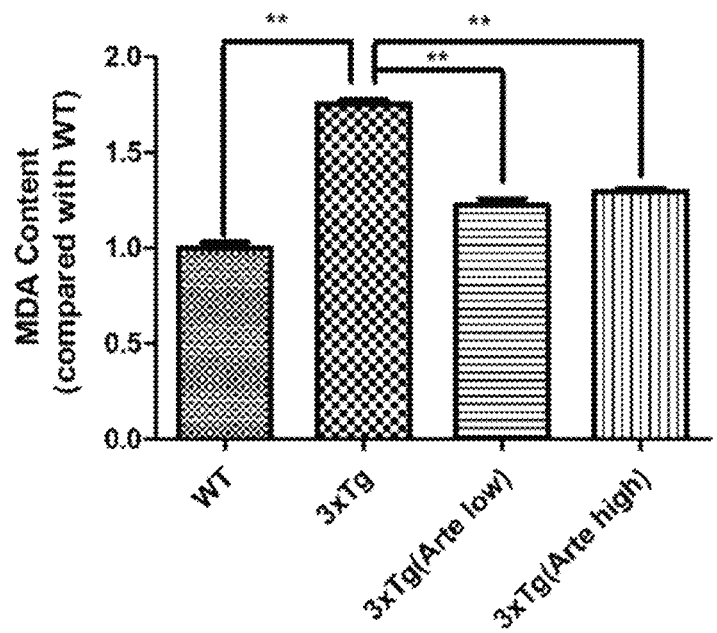
FIG. 8A~FIG. 8B. Artemether reduces malondialdehyde (MDA) levels and increases superoxide dismutase (SOD) levels in 3xTg AD mice. Enzyme-linked immunosorbent assay was used to determine the levels of malondialdehyde (MDA) (FIG. 8A) and superoxide dismutase (SOD) (FIG. 8B). The results show that artemether reduced MDA and increased SOD levels. 3xTg mice in the figure represents 3xTg AD mice in the specification.
Figure 8B:
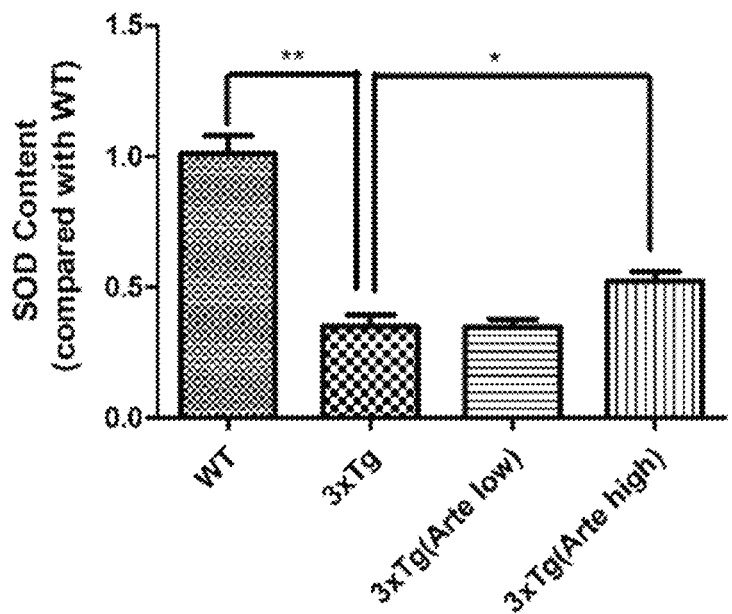

Results: FIG. 8A-FIG. 8B show that artemether treatment reduced significantly the MDA levels in 3xTg AD mice in comparison with untreated animals (FIG. 8A). Moreover, SOD content was significantly increased by artemether indicating that it can reduce the oxidative damage of 3xTg AD mice and increase the antioxidant capacity in the brain (FIG. 8B).

Embodiment 9: Effect of Different Doses of Artemether on the Signaling of AMPK/GSK3β Pathway 12-month-old Alzheimer's disease transgenic mice (n=40) were divided into 4 groups (10 animals per group). The animals from the drug treatment groups received daily intraperitoneal injections of artemether for 1 month. Their body weight was measured before each administration in order to calculate artemether dosage. After this period, the mice were decapitated and the brain tissues were collected and stored in a refrigerator at −80° C. for subsequent Western Blot analysis.

The specific implementation method is as follows:

At the end of the experiment the mice were decapitated, intact brains were collected and the olfactory bulb was removed. The brain tissue was fully cut on ice and put into the lysis solution containing 100 μL of PMSF per 10 mL of RIPA at a concentration of 100 mM, phosphatase and protease inhibitors cocktail. After mixing well and placing on ice for 20 minutes, the brain tissues in the lysis solution were homogenized with a grinding rod on ice. Lysed samples were centrifuged at 12000 rpm, 4° C. for 15 min, and the protein concentration of the supernatant was determined using a BCA protein assay kit, according to the manufacturer's instructions. The samples were resolved by SDS-PAGE (polyacrylamide gel electrophoresis) and transferred to PVDF membranes. The membranes were then blocked in 5% BSA in PBST for 1 hour followed by overnight incubation at 4° C. in primary antibodies at a 1:1000 dilutions in PB ST with 1% BSA. In the following day, the membranes were washed three times with 1×PBST and incubated with horseradish peroxidase conjugated anti-rabbit secondary antibody at a dilution of 1:5000 for 1 hour at room temperature. Immunodetection was performed using the ECL detection kit reagent and the expression of proteins related to AMPK signaling pathway were detected.

Figure 9A:
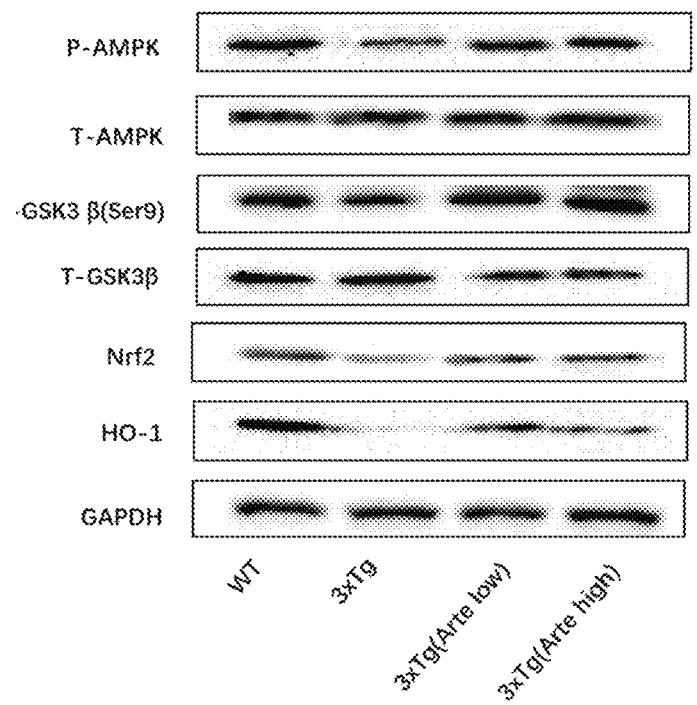
FIG. 9A~FIG. 9E. Artemether stimulates the phosphorylation of AMP protein kinase/glycogen synthase kinase 3β (ser9) and increases the expression of Nrf2 and heme oxygenase-1 (HO-1).
Figure 9B:
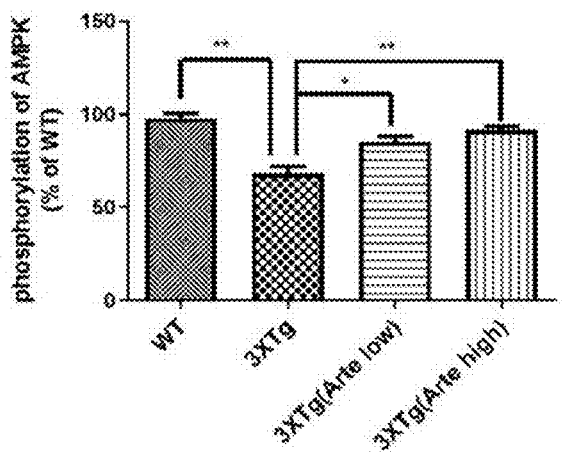
Figure 9C:
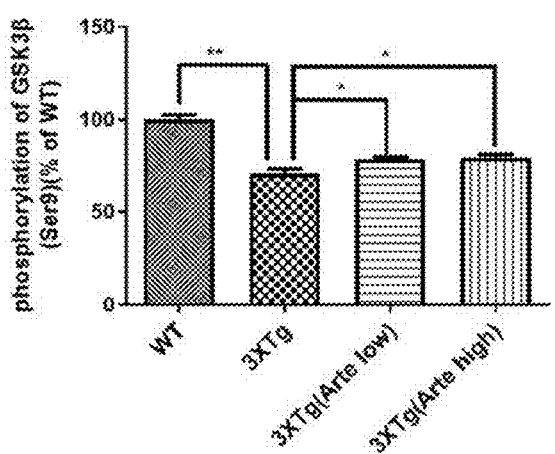
Figure 9D:
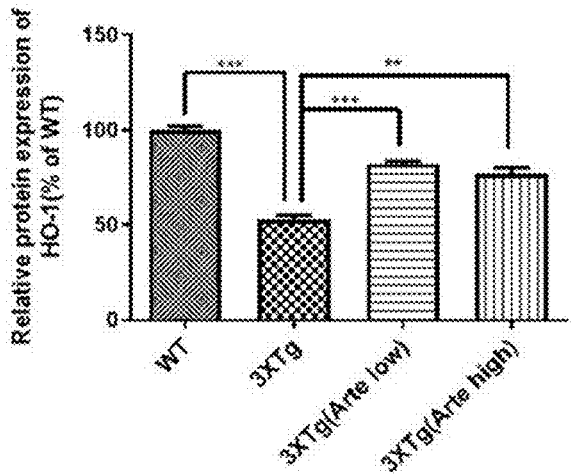
Figure 9E:
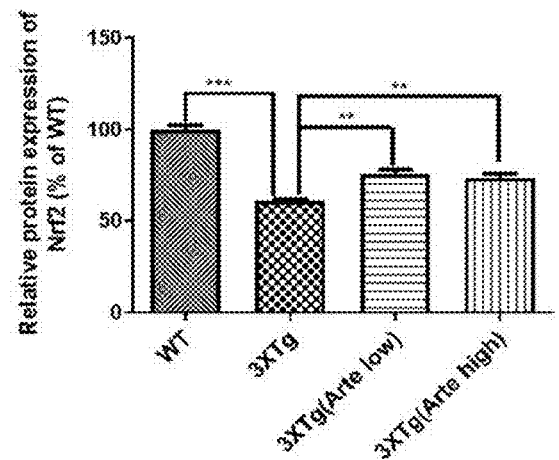

Results: As shown in FIG. 9A-'FIG. 9E, artemether treatment increased the phosphorylation of AMPK and GSK3β proteins in the brain of 3xTg AD mice, indicative that artemether can increase the activities of AMPK/GSK3β pathway. Moreover, artemether treatment increased the expression levels of Nrf2 and heme oxygenase-1 (HO-1), indicative of an increase of the antioxidant capacity in the brain (FIG. 9B-' FIG. 9E) refer to the quantification and statistical analysis of the western blots (FIG. 9A).

Embodiment 10: In Vitro Verification of Artemether Protective Effect Against Aβ$_{1-42}$-Induced Cytotoxicity in Nerve Cells PC12 cells were cultured in DMEM (Dulbecco's Modified Eagle's) medium supplemented with 10% fetal bovine serum (FBS) and 100 μg/ml streptomycin in a humidified incubator 5% $CO_2$ at 37° C. The cells were seeded in 96-well plates, and then treated with Aβ$_{1-42a}$ and artemether. MTT assay was used to access cell viability. MTT (3-(4,5-dimethylthiazole-2)-2,5-diphenyltetrazolium bromide) the detection principle relies on the enzymatic reduction of MTT to water-insoluble purple crystals-formazan particles, which is catalyzed by mitochondrial succinate dehydrogenase produced in living cells. The light absorption value is measured by an enzyme-linked immunoassay at 570 nm wavelength allowing to determine the number of living cells based on the amount of formazan produced. In short, PC12 cells were seeded in 96-well plates. In the next day the medium was replaced with fresh DMEM, and the cells pretreated with different concentrations of artemether or untreated followed by incubation with 1 μM $Aβ_{1-42}$ for 24 hours. After 24 hours, MTT (0.5 mg/mL) was added to each well and further incubated for another 3 hours at 37° C. After incubation, the cells and MTT formazan crystals were dissolved with DMSO, and the absorbance was measured at 570 nm. Cell viability was calculated as a percentage of the control group.

Figure 10A:
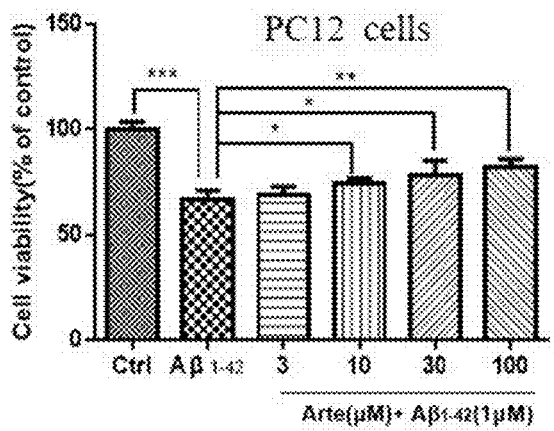
FIG. 10A~FIG. 10C. Artemether attenuates $A\beta_{1-42}$-induced cytotoxicity in neuronal cells.
Figure 10B:
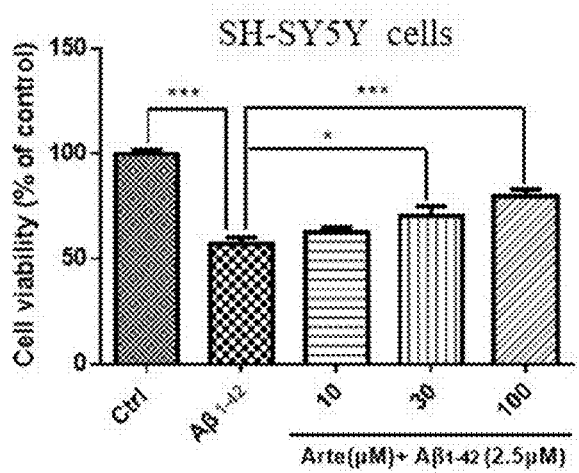
Figure 10C:
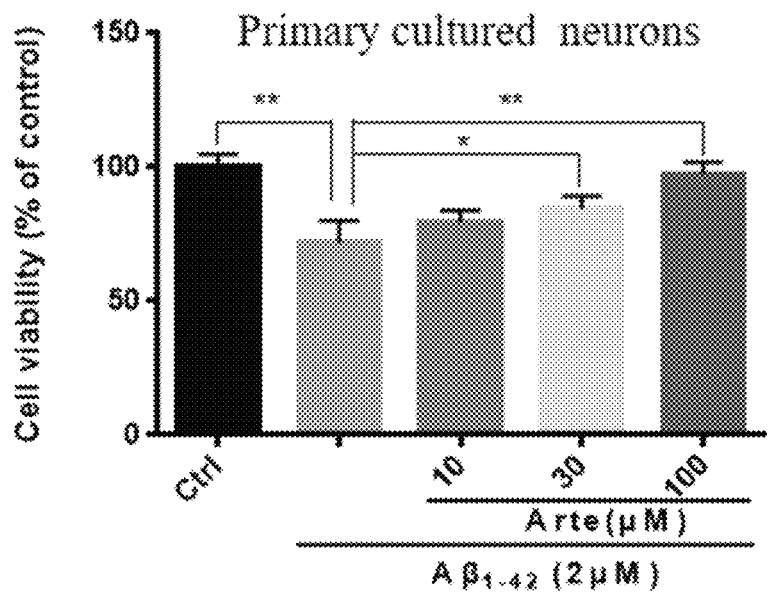
Figure 11A:
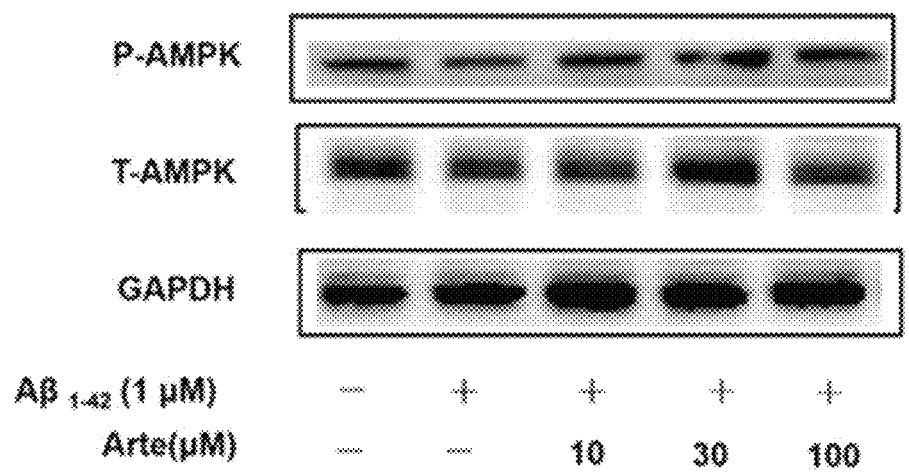
FIG. 11A~FIG. 11D. Artemether concentration-dependently reversed the inhibitory effect of $A\beta_{1-42}$ on AMPK and GSK3β (ser9) activation in PC12 cells.
Figure 11B:
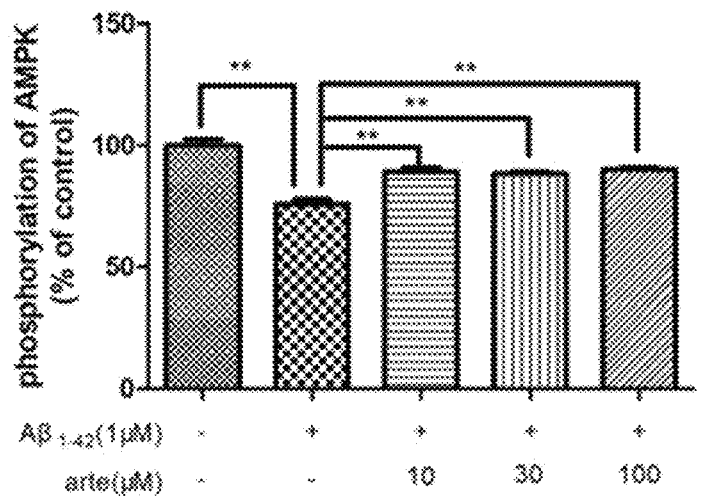
Figure 11C:
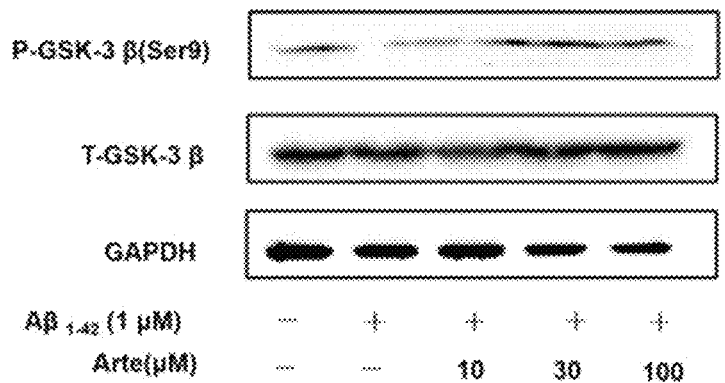
Figure 11D:
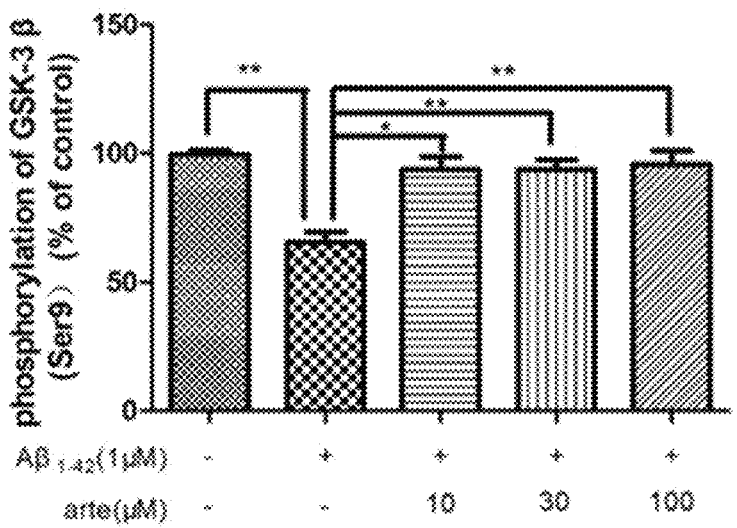

Results: Artemether protected PC12 cells from $Aβ_{1-42}$-induced cytotoxicity in a concentration-dependent manner (FIG. 10A), and the effective dose is about 10 μM. In order to further study the possible neuroprotective effect of artemether on other neuronal cells, we also studied its neuroprotective effects on SH-SYSY human neuroblastoma and mouse primary nerve cell cultures (FIG. 10B). It was found that artemether also protects these cells from $Aβ_{1-42}$-induced cell death in a concentration-dependent manner, which was consistent with the neuroprotective effect in the PC12 cell model (FIG. 10A-FIG. 10C).

Embodiment 11: Effect of Artemether on the Activation of AMPK/GSK3β (Ser9) Signaling Pathway In Vitro PC12 cells were cultured in DMEM (Dulbecco's Modified Eagle's) medium supplemented with 10% fetal bovine serum (FBS) and 100 μg/ml streptomycin in a humidified incubator 5% $CO_2$ at 37° C. The cells were treated with or without artemether, incubated with $Aβ_{1-42}$, harvested and lysed for western blot analysis.

The specific implementation method is as follows:

Cells pre-treated with or without artemether followed by incubation with $Aβ_{1-42}$ were collected, washed with cold PBS and lysed on ice in 1× sample lysis buffer containing freshly added protease and phosphatase inhibitors. Lysed cells were centrifuged at 13,000 rpm for 15 min for protein quantification. Proteins were separated by polyacrylamide gel electrophoresis and transferred to PVDF membranes. Membranes were blocked in 5% skim milk powder in PBST for 1 hour. Then primary antibodies were added and incubated overnight at 4° C. The following day membranes were washed three times with 1×TBST followed by incubation with horseradish peroxidase conjugated secondary antibody for 1 h at room temperature and immuno-detected using an ECL detection kit. The expression of proteins related to the AMPK signaling pathway were then examined.

Results: as shown in FIG. 11A-FIG. 11D, artemether alleviated the inhibitory effect of $Aβ_{1-42}$ on the phosphorylation of AMPK and GSK3β (ser9) in PC12 cells in a concentration-dependent manner. This illustrates that artemether can increase (activate) the phosphorylation of AMPK and the phosphorylation of GSK-3β (ser9) in the PC12 cell model, thereby counteracting the inhibitory effect of $Aβ_{1-42}$.

Embodiment 12: AMPK Inhibitor Compound C could Significantly Inhibit the Protective Effect of Artemether on $Aβ_{1-42}$-Induced PC12 Cell Injury Apoptosis was evaluated by flow cytometry. PC12 cells were seeded into 6-well plates, treated, digested with 0.25% trypsin, harvested, washed twice with ice cold 1×PBS and suspended with buffer. Cell supernatants were stained with 5 μL Annexin-V-FITC and 10 μL propidium iodide solution, incubated for 30 min in the dark, and the apoptotic cells in each group were determined and analyzed using a flow cytometer. The other steps are the same as in Embodiment 2.4 and Embodiment 10.

Figure 12A:
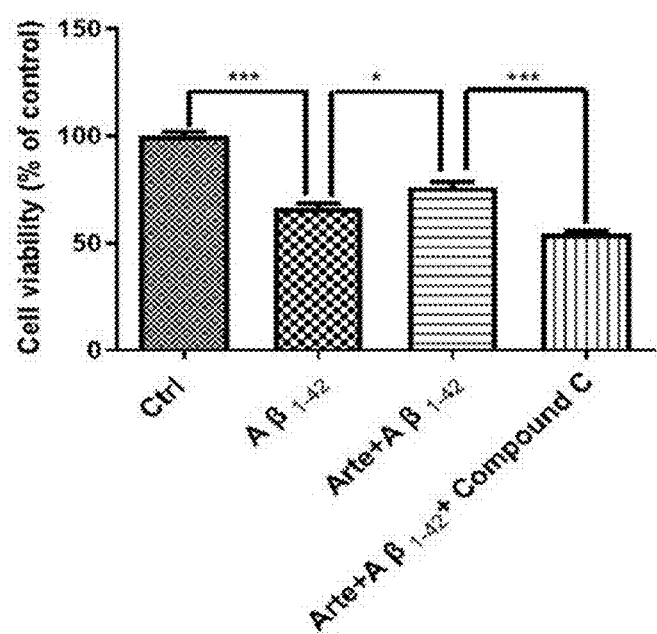
FIG. 12A~FIG. 12F. Inhibition of AMPK expression levels weakens the protective effect of artemether in PC12 cells.
Figure 12B:
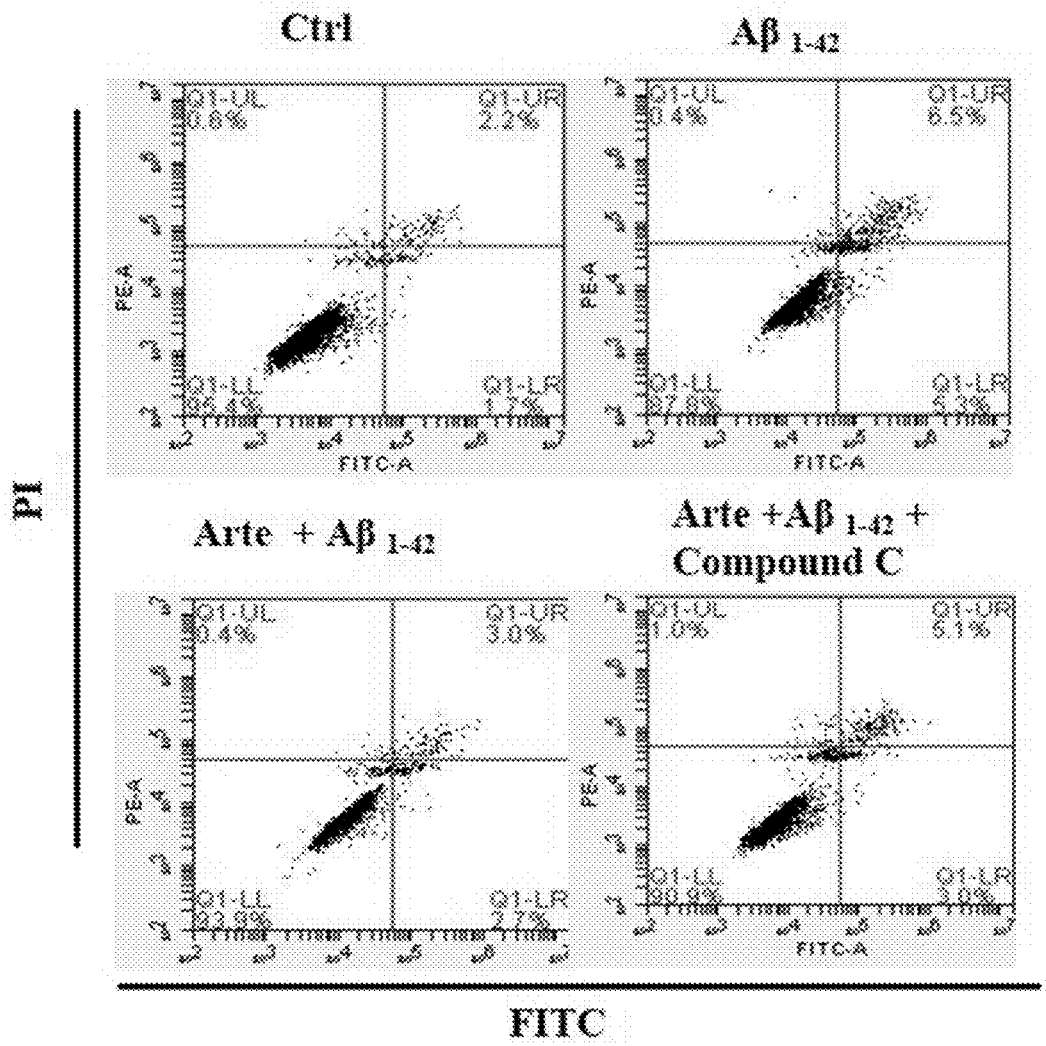
Figure 12C:
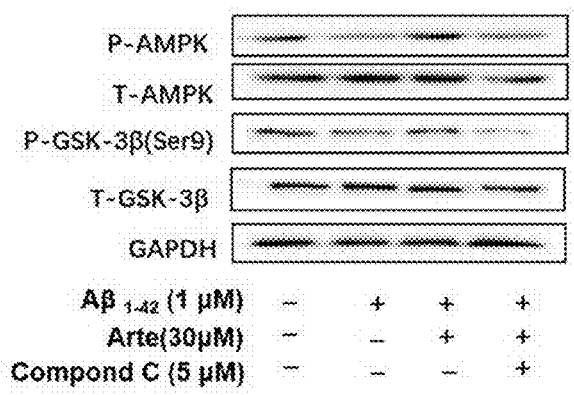
Figure 12D:
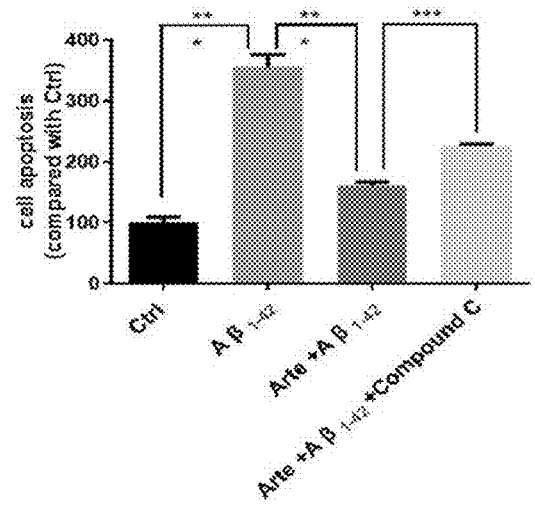
Figure 12E:
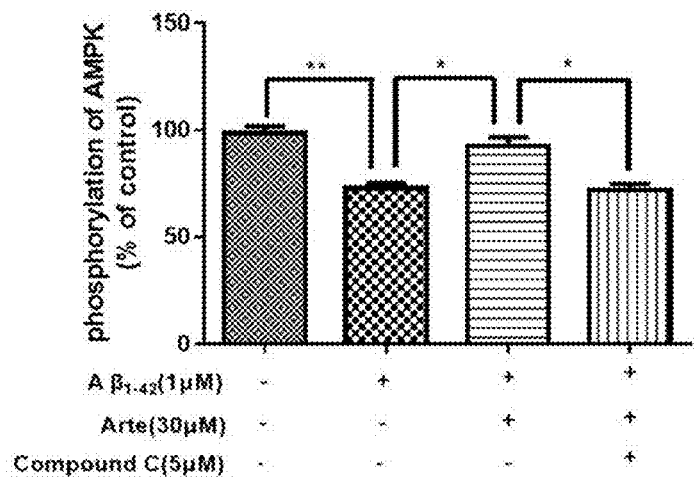
Figure 12F:
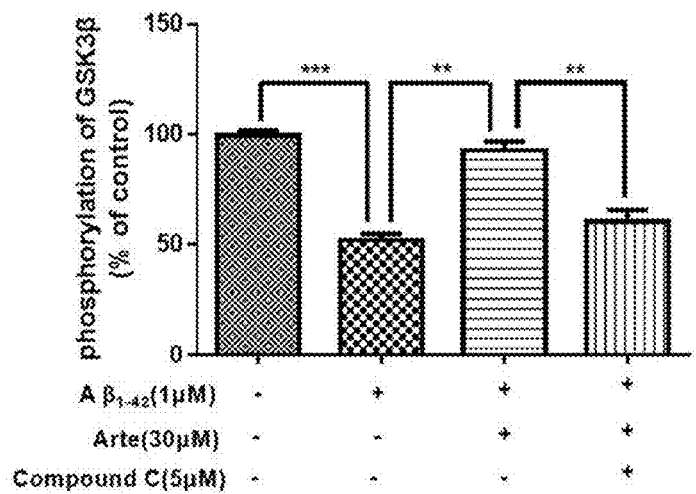

Results: As shown in FIG. 12A-FIG. 12F, AMPK inhibitor compound C significantly inhibited the protective effect of artemether on $Aβ_{1-42}$-induced cell injury as it abolished the elevated cell survival effect of artemether on $Aβ_{1-42}$-induced cell injury (FIG. 12A), alleviated the protective effect of artemether on $Aβ_{1-42}$-induced apoptosis (FIG. 12B, FIG. 12C) and the phosphorylation of AMPK and GSK3β (ser9) (FIG. 12D-' FIG. 12F).

Embodiment 13: Effect of Different Doses of Artemether on Choline Acetyltransferase and Neurogenesis in the Brain of C57 Mice 6-week-old C57 mice were divided in 2 groups. The animals from the drug treatment groups received intraperitoneal injections of artemether. Their body weight was measured before each administration in order to calculate artemether dosage. After an hour injection, the mice were killed and the brain tissues were fully cut on ice and put into the lysis solution containing 100 μL of PMSF per 10 mL of RIPA at a concentration of 100 mM, phosphatase and protease inhibitors cocktail. After mixing well and placing on ice for 20 minutes, the brain tissues in the lysis solution were homogenized with a grinding rod on ice. Lysed samples were centrifuged at 12000 rpm, 4° C. for 15 min, and the protein concentration of the supernatant was determined using a BCA protein assay kit, according to the manufacturer's instructions. The samples were analyzed by western blot. The specific operation is the same as embodiment 9.

Figure 13:
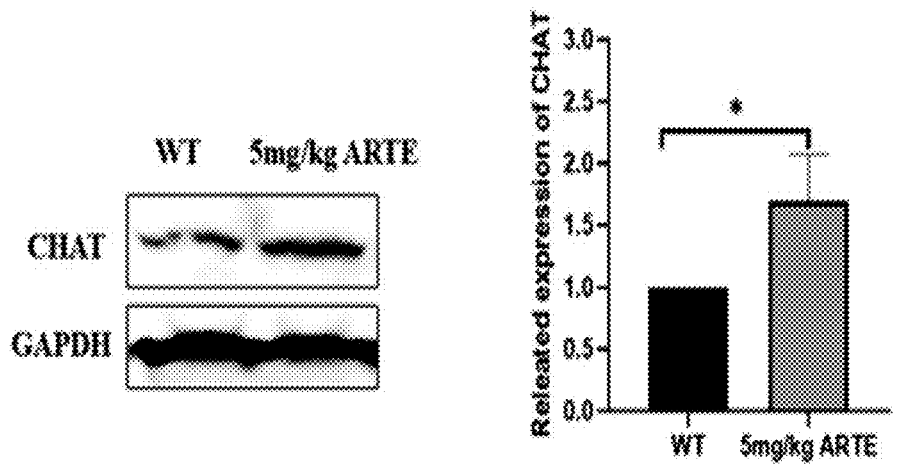
FIG. 13. Artemether increases the expression levels of choline acetyltransferase (ChAT) in the brain of C57 mice. ChAT is a marker of cholinergic neurons and can be used to evaluate the function of cholinergic neurons in the brain. Western blot was used to test the expression of ChAT in the brain of C57 mice after treatment with artemether. The results show that artemether increased the levels of ChAT in C57 mice.

Results: FIG. 13 shows that artemether promoted the increase of ChAT levels in the brain of C57 mice. Artemether (ARTE) significantly increased brain acetylcholine transferase (ChAT) activity in C57 mice.

Embodiment 14: Effect of Different Doses of Artemether on Choline Acetyltransferase and Neurogenesis in HT22/D407/PC12 Cells PC12/HT22/D407 cells were cultured in DMEM (Dulbecco's Modified Eagle's) medium supplemented with 10% fetal bovine serum (FBS) and 100 μg/ml streptomycin in a humidified incubator 5% $CO_2$ at 37° C. The cells were seeded in 12-well plates, and then treated with artemether. Western blot was used to access the expression of ChAT. The specific operation of western blot is the same as embodiment 11.

Results: FIG. 14A-FIG. 14C shows that artemether increased ChAT expression levels in multiple cell types including HT22/D407/PC12 cells. Artemether (ARTE) significantly increased the expression of acetylcholine transferase (ChAT) in neuronal PC12 cells (FIG. 14A); Artemether (ARTE) significantly increased the expression of acetylcholine transferase (ChAT) in epithelial D407 cells (B); Artemether (ARTE) significantly increased the expression of acetylcholine transferase (ChAT) in hippocampal neuronal HT22 cells (FIG. 14C).

The above examples are preferred embodiments of the invention, but the embodiments of the invention are not limited by the above examples. Any other modification, substitution, combination, simplification that not deviating from the mental essence of the invention and as made under the principles shall be equivalent substitutions, all of which are covered by the scope of the invention.

What is claimed is:

1. A method for the treatment of diseases related to insufficiency of AMPK phosphorylation and GSK-3β (ser9) phosphorylation in a subject in need thereof, comprising: administering artemether to the subject; wherein the diseases related to insufficiency of AMPK phosphorylation and GSK-3β (ser9) phosphorylation comprise one or more selected from the group consisting of pulmonary infectious diseases and pulmonary fibrosis, and the dosage of artemether is about 0.1 mg/kg body weight/day to about 20 mg/kg body weight/day.

2. The method of claim 1, wherein said method further comprises: detecting a patient with insufficiency of AMPK phosphorylation and GSK-3β (ser9) phosphorylation.

3. The method of claim 1, wherein said artemether is administered at least once per day.

4. The method of claim 1, wherein said artemether is administered by injection or orally.

* * * * *